Dec. 29, 1964  J. P. LINDSEY ETAL  3,163,750
SIGNAL CORRELATION MEASUREMENT

Filed Feb. 1, 1960  5 Sheets-Sheet 1

INVENTOR.
J. P. LINDSEY
J. O. RICE
BY
Hudson & Young
ATTORNEYS

INVENTOR.
J. P. LINDSEY
J. O. RICE
BY
Hudson & Young
ATTORNEYS

United States Patent Office 3,163,750
Patented Dec. 29, 1964

3,163,750
SIGNAL CORRELATION MEASUREMENT
Joe P. Lindsey and Jack O. Rice, Bartlesville, Okla., assignors to Phillips Petroleum Company, a corporation of Delaware
Filed Feb. 1, 1960, Ser. No. 5,935
5 Claims. (Cl. 235—181)

This invention relates to measuring the correlation between electrical signals.

In the interpretation of seismic signals it is often desirable to measure the correlation between two or more of the signals. This procedure is useful in recognizing desired reflections in the presence of background noise. Such a measurement also provides the operator with information concerning time differences between individual signals so that appropriate corrections can be made to recognize common vibration patterns. In order to measure the correlation between electrical signals, it has heretofore been necessary to multiply one of the signals by the other. While this can be accomplished with multiplying apparatus known in the art, such apparatus is quite expensive to construct and is often plagued by a zero drift.

In accordance with the present invention, a system is provided for measuring the correlation between seismic signals without actually multiplying one of the signals by the other. This is accomplished by clipping both of the signals to remove vibrations having amplitudes greater than preselected values. The two clipped signals are added and the resulting sum is rectified. One of the original clipped signals is also subtracted from the other and the resulting difference is rectified. One of the rectified signals is subtracted from the other and the difference is integrated over a predetermined time interval. This provides an output signal which is representative of the correlation between the original signals. The apparatus employed to carry out this method does not require a complicated multiplying circuit, but instead utilizes relatively simple summing amplifiers and rectifiers.

Accordingly, it is an object of this invention to provide simplified apparatus for measuring the correlation between electrical signals.

A further object is to provide apparatus for use in interpreting seismic signals.

Other objects, advantages and features of this invention should become apparent from the following detailed description, taken in conjunction with the accompanying drawing in which.

Figure 1:
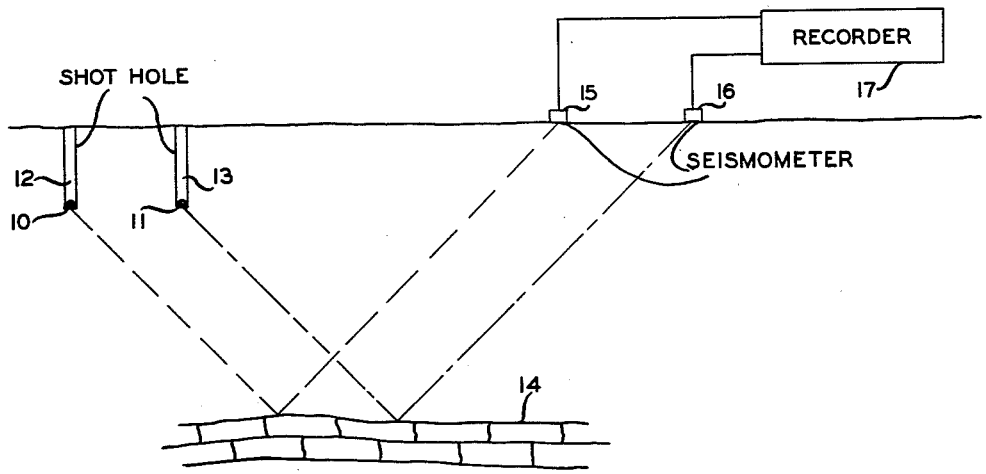
FIGURE 1 is a schematic representation of a conventional seismic exploration system.

Referring now to the drawing in detail and to FIGURE 1 in particular, explosive charges 10 and 11 are detonated in sequence in respective shot holes 12 and 13. Resulting vibrations are reflected from a subterranean formation 14 and are received by respective seismometers 15 and 16. The output signals from seismometers 15 and 16 are transmitted to a recorder 17 which can be a magnetic storage drum, for example. The signals recorded from seismometers 15 and 16 are referred to hereinafter as respective signals A and B. Portions of two such signals are illustrated schematically by curves A and B of FIGURE 4a. The apparatus of this invention is employed to measure the correlation between these two signals.

The two signals A and B are subsequently reproduced from recorder 17 and applied to the inputs of respective bipolar clippers 20 and 21 of FIGURE 2. The two output signals from clippers 20 and 21 are applied to the respective inputs of an adder 22. The output signal of adder 22 is transmitted through a rectifier 23 to the first input of a subtractor 24. The output signal of clipper 21 is also applied to the first input of a second adder 26. The output signal of clipper 20 is applied through an inverter 25 to the second input of adder 26. The output signal of adder 26 is transmitted through a rectifier 27 to the second input of subtractor 24. The output signal of subtractor 24 is applied through an integrator 28 to a recorder 29.

Figure 2:
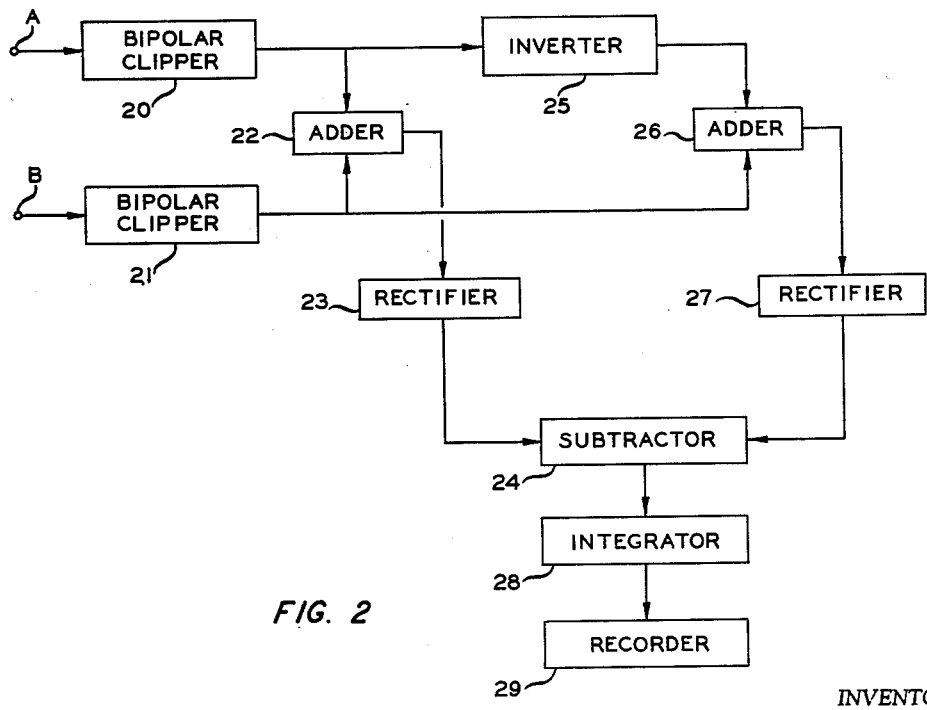
FIGURE 2 is a schematic drawing of the apparatus of this invention.
Figure 4A:
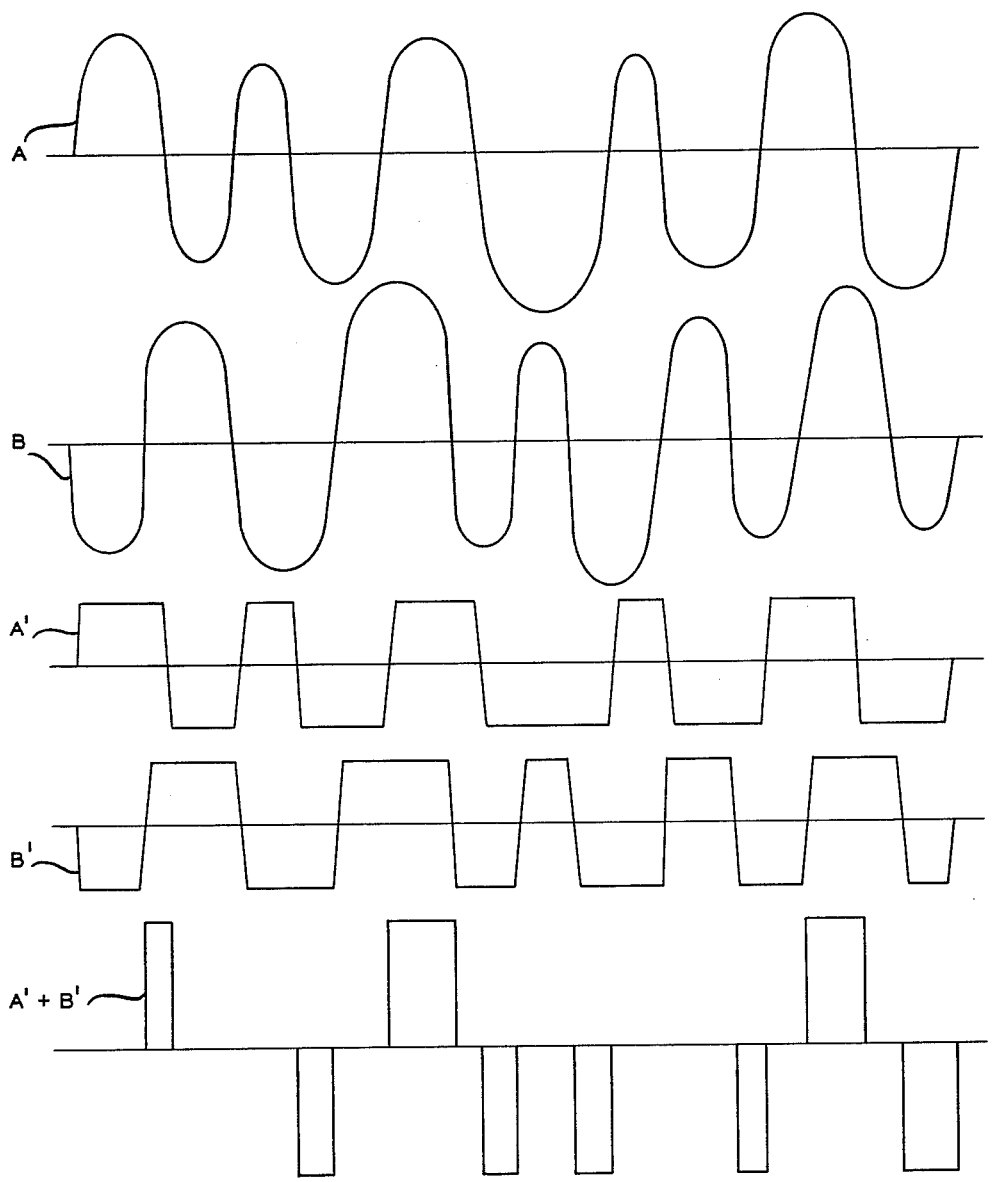
FIGURES 4a and 4b are graphical representations of the correlation process of this invention.
Figure 4B:
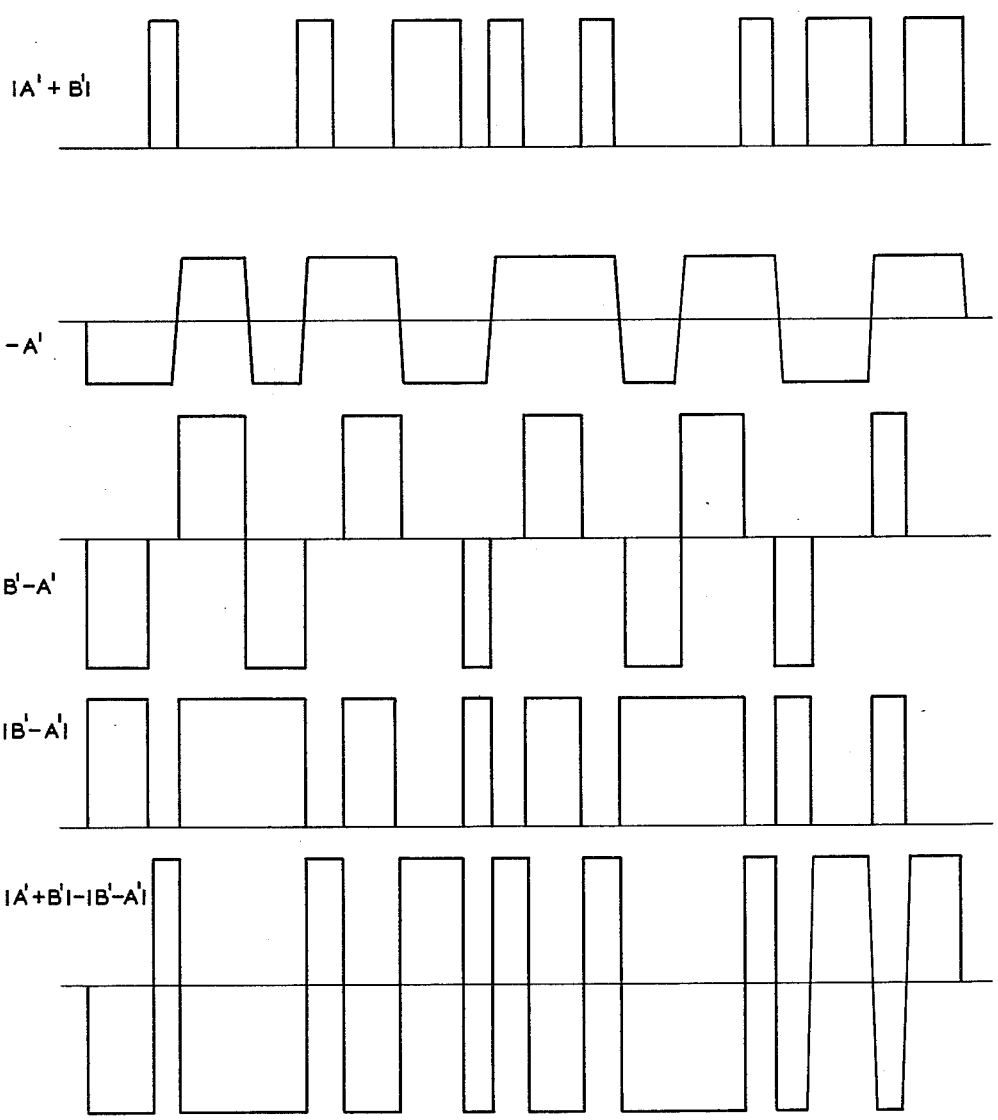

The operation of this circuit of FIGURE 2 to measure the correlation between signals A and B is illustrated schematically in FIGURE 4a and 4b. The output signals of clippers 20 and 21 are represented by respective curves A' and B'. The output signal of adder 22 is represented by curve $A'+B'$. The output signal of rectifier 23 is illustrated by curve $|A'+B'|$. Signal A' is converted to signal $-A'$ by inverter 25 and added to signal B' by adder 26 to produce signal $B'-A'$. The output signal of rectifier 27 is represented by curve $|B'-A'|$. This signal is subtracted from $|A'+B'|$ by subtractor 24 to provide an output signal $|A'+B'|-|B'-A'|$ which is subsequently integrated and applied to recorder 29.

Figure 3:
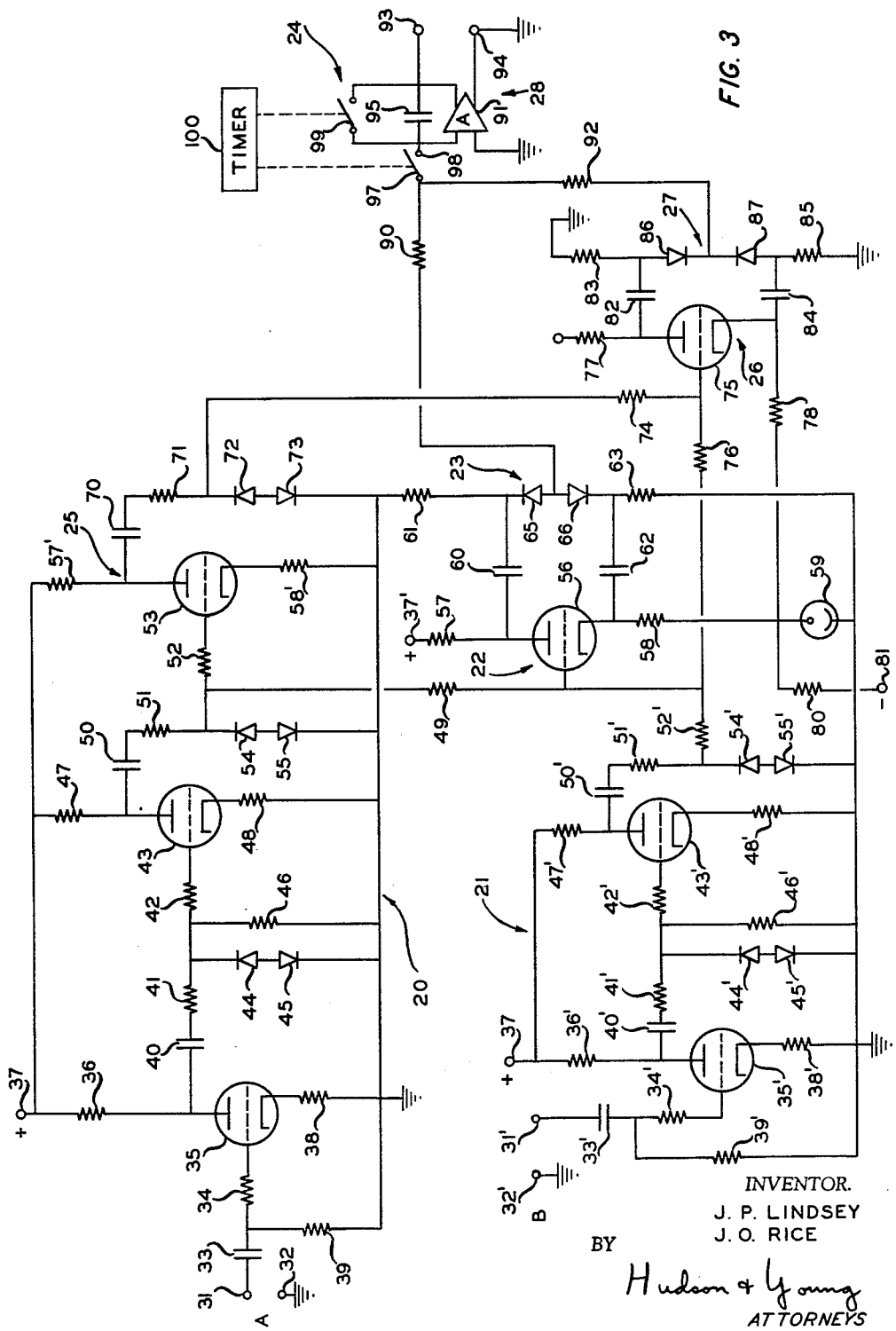
FIGURE 3 is a schematic circuit drawing of the apparatus illustrated in FIGURE 2.

A specific embodiment of the circuit employed to carry out these operations is illustrated in FIGURE 3. The input signal A is applied between terminals 31 and 32, the latter being grounded. Terminal 31 is connected through a capacitor 33 and a resistor 34 to the control grid of a triode 35. The anode of triode 35 is connected through a resistor 36 to a terminal 37 which is maintained at a positive potential. The cathode of triode 35 is connected to ground through a resistor 38. The junction between capacitor 33 and resistor 34 is connected to ground through a resistor 39. The anode of triode 35 is connected through a capacitor 40 and resistors 41 andd 42 to the control grid of a triode 43. The junction between resistors 41 and 42 is connected to ground through a pair of rectifiers 44 and 45 which are connected in opposition to one another. A resistor 46 is connected in parallel with rectifiers 44 and 45. The anode of triode 43 is connected to terminal 37 through a resistor 47, and the cathode of triode 43 is connected to ground through a resistor 48. The anode of triode 43 is connected through a capacitor 50 and resistors 51 and 52 to the control grid of the triode 53. The junction between resistors 51 and 52 is connected to ground through a pair of rectifiers 54 and 55 which are connected in opposition to one another.

The circuit thus far described forms bipolar clipper 20. The incoming signal is amplified by triodes 35 and 43 in order to provide a signal of desired amplitude. Rectifiers 44 and 45 and rectifiers 54 and 55 serve to clip signal A to establish signal A'. These rectifiers can advantageously be silicon junction diodes which have an extremely high back resistance at moderate back voltages, but which break down at a particular voltage which is known as the Zener voltage.

The bipolar clipper 21 is identical to clipper 20 and corresponding elements are designated by like primed reference numerals. The junction between resistors 51 and 52 is connected through a resistor 49 to the control grid of a triode 56. The junction between resistor 51' and rectifier 54' is connected through resistor 52' to the control grid of triode 56. The anode of triode 56 is connected through a resistor 57 to a terminal 37'. The cathode of triode 56 is connected to ground through a resistor 58 and a voltage regulating tube 59. The junction between resistor 58 and tube 59 is connected through a resistor 80 to a terminal 81 which is maintained at a negative potential. The anode of triode 56 is also connected through a capacitor 60 and a resistor 61 to ground. The cathode of triode 56 is also connected through a capacitor 62 and a resistor 63 to ground. The first terminal of a rectifier 65 is connected to the junction between capacitor 60 and resistor 61, and the corresponding first terminal of a rectifier 66 is connected to the junction between capacitor 62 and resistor 63.

Triode 56 serves to add the two input signals to form adder 22, and rectifiers 65 and 66 rectify the output signal to form rectifier 23.

The anode of triode 53 is connected through a capacitor 70, a resistor 71 and rectifiers 72 and 73 to ground. Rectifiers 72 and 73 are connected in opposition to one another. This circuit constitutes inverter 25.

The junction between resistor 71 and diode 72 is connected through a resistor 74 to the control grid of a triode 75. The second terminal of resistor 52' is connected through a resistor 76 to the control grid of triode 75. The anode of triode 26 is connected through a resistor 77 to terminal 37, and the cathode of triode 75 is connected to ground through a resistor 78 and voltage regulating tube 59. The anode of triode 75 is connected through a capacitor 82 and a resistor 83 to ground. The cathode of triode 75 is connected through a capacitor 84 and a resistor 85 to ground. The first terminal of a rectifier 86 is connected to the junction between capacitor 82 and resistor 83, and the corresponding terminal of a rectifier 87 is connected to the junction between capacitor 84 and resistor 85. The circuit associated with triode 75 constitutes adder 26 and rectifier 27.

The junction between diodes 65 and 66 is connected through a resistor 90 to a switch 97. When switch 97 is closed, it engages a terminal 98 which is connected to the first input terminal of an operational amplifier 91, the second input terminal of which is connected to ground. The junction between diodes 86 and 87 is connected through a resistor 92 to switch 97. The two output terminals of amplifier 91 are connected to respective input terminals 93 and 94 of recorder 29 of FIGURE 2. Amplifier 91 is provided with a feedback capacitor 95 which is shunted by a switch 99 so as to form integrator 28. The two signals from rectifiers 23 and 27 are thus summed and integrated. Resistors 90 and 92 have the same value so that the time constant of the integrator is equal to the product of one of these resistors times the capacitance of capacitor 95.

Switches 97 and 99 are actuated by a timer 100. At the beginning of a correlation period, switch 99 is closed momentarily to discharge capacitor 95. Switch 97 is then closed for the desired integration period, which can be of the order of one-fourth to four seconds, for example. The integrated output is then stored on capacitor 95 until switch 99 is closed at the beginning of the next cycle.

Figure 5:
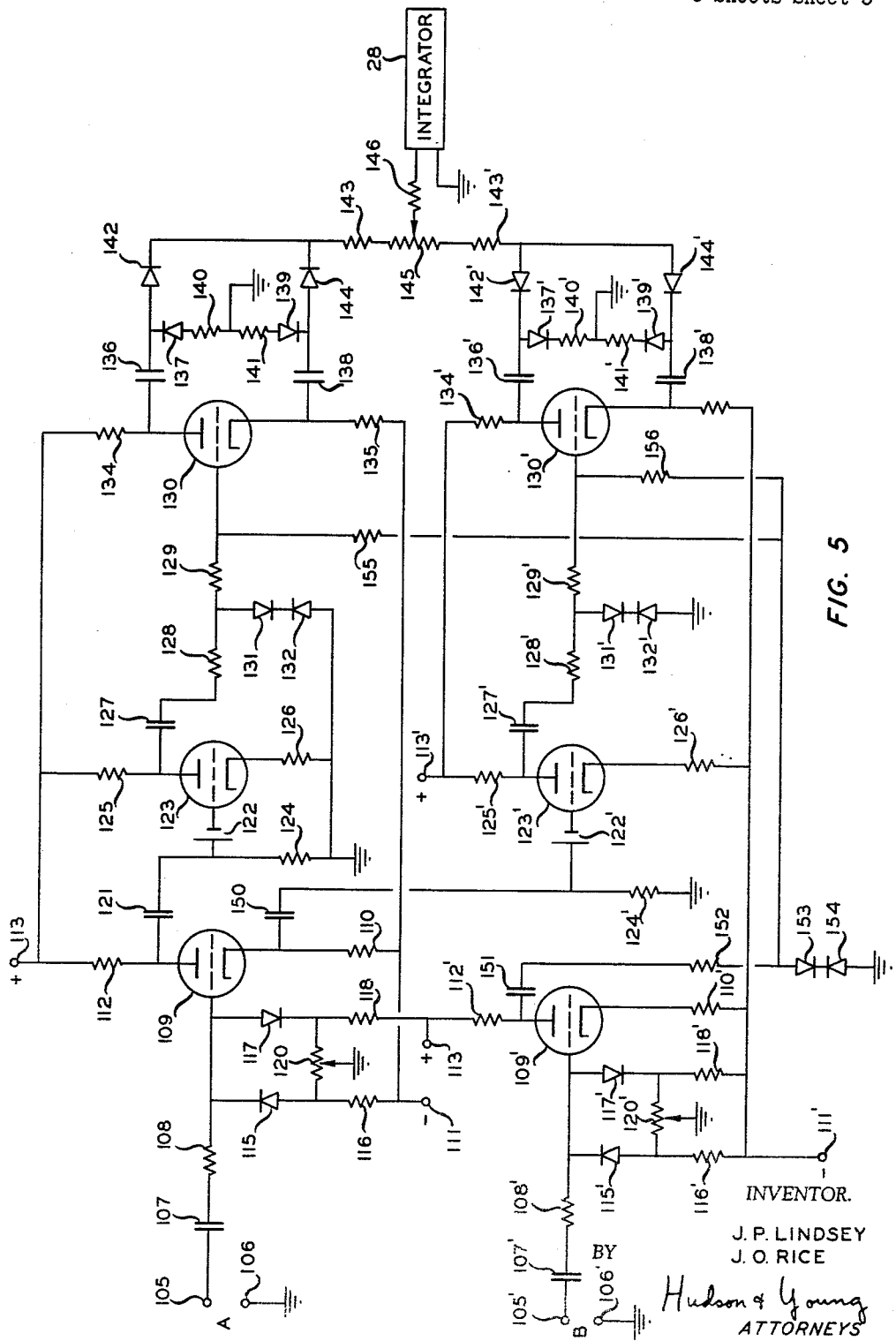
FIGURE 5 is a schematic circuit drawing of a second embodiment of the apparatus of this invention.

A second embodiment of the correlation of this invention is illustrated in FIGURE 5. The input signal A is applied between terminals 105 and 106, the latter being grounded. Terminal 105 is connected through a capacitor 107 and a resistor 108 to the control grid of a triode 109. The cathode of triode 109 is connected through a resistor 110 to a terminal 111 which is maintained at a negative potential. The anode of triode 109 is connected through a resistor 112 to a terminal 113 which is maintained at a positive potential. The control grid of triode 109 is connected through a rectifier 115 and a resistor 116 to terminal 111. The control grid of triode 109 is also connected through a rectifier 117 and a resistor 118 to terminal 113. The junction between rectifier 115 and resistor 116 is connected to the junction between rectifier 117 and resistor 118 by a potentiometer 120, the contactor of which is connected to ground. The polarities of rectifiers 115 and 117 are reversed with respect to the control grid of triode 109.

The circuit thus far described in FIGURE 5 forms a second embodiment of bipolar clipper 20 wherein rectifiers 115 and 117 serve to clip the input signal. Potentiometer 120 permits the clipper to be adjusted. Bipolar clipper 21 is identical to clipper 20 and corresponding elements are designated by like primed reference numerals.

The anode of triode 109 is connected through a capacitor 121 and a bias voltage source 122 to the control grid of a triode 123. The junction between capacitor 121 and voltage source 122 is connected to ground through a resistor 124. The anode of triode 123 is connected through a resistor 125 to terminal 113, and the cathode of triode 123 is connected to ground through a resistor 126. The anode of triode 123 is connected through a capacitor 127, a resistor 128 and a resistor 129 to the control grid of a triode 130. The junction between resistors 128 and 129 is connected to ground through rectifiers 131 and 132 which are connected in opposition to one another. The anode of triode 130 is connected through a resistor 134 to terminal 113, and the cathode of triode 130 is connected through a resistor 135 to terminal 111. The anode of triode 109' is connected through a capacitor 151, a resistor 152 and a resistor 155 to the control grid of triode 130. The junction between resistors 152 and 155 is connected to ground through rectifiers 153 and 154 which are connected in opposition to one another. Triode 130 corresponds to adder 22 of FIGURE 2. The two clipped signals are applied to the input of triode 130 through respective resistors 129 and 155.

The anode of triode 130 is connected through a capacitor 136 to the first terminal of a rectifier 137. The cathode of triode 130 is connected through a capacitor 138 to the first terminal of a rectifier 139. The second terminal of rectifier 137 is connected to the second terminal of rectifier 139 through resistors 140 and 141, the junction between these resistors being connected to ground. The junction between capacitor 136 and rectifier 137 is connected through a rectifier 142 and a resistor 143 to the first end terminal of a potentiometer 145. The junction between capacitor 138 and rectifier 139 is connected through a rectifier 144 and resistor 143 to the first terminal of potentiometer 145. The contactor of potentiometer 145 is connected through a resistor 146 to the first input terminal of integrator 28. The output circuit associated with triode 130 corresponds to rectifier 23.

The cathode of triode 109 is connected through a capacitor 150 and a voltage source 122' to the control grid of a triode 123'. The anode of triode 123' is connected through a capacitor 127', a resistor 128' and a resistor 129' to the control grid of a triode 130'. The junction between resistor 152 and rectifier 153 is connected through a resistor 156 to the control grid of triode 130'. Two clipped signals are thus applied to the input of triode 130' which functions as an adder corresponding to element 26 in FIGURE 2. The clipped signal from triode 109 is 180° out of phase with the signal from triode 109' because the former is removed from the cathode whereas the latter is removed from the anode. This provides inversion of one of the signals corresponding to element 25 of FIGURE 2.

The output circuit associated with triode 130' is generally similar to the circuit associated with triode 130 and corresponding elements are designated by like primed reference numerals. It should be noted, however, that the polarities of all of the rectifiers are reversed. The rectifier output signal from triode 130' is applied through resistor 143' to the second end terminal of potentiometer 145. The signal from triode 130' is effectively subtracted from the signal from triode 130.

As previously mentioned, the apparatus of this invention can be used to determine the correlation between seismic signals in order to recognize common vibration patterns in the presence of noise. This apparatus is also useful in determining the proper time corrections to be applied in combining a plurality of seismic signals received at different geophones. For example, the integrated product of two signals can be plotted against the step-out between the two signals which are received at different seismometers. The positive maximum thus occurs when the step-out between the two signals is correct for alignment of the two signals with respect to one another for further seismic processing.

While this invention has been described in conjunction with a present preferred embodiment, it should be evident that it is not limited thereto.

What is claimed is:

1. Apparatus for correlating electrical signals comprising first and second bipolar clippers, first and second signal adding means, first and second full wave rectifiers, a signal inverter, means to apply two signals to be correlated to the inputs of said first and second clippers, respectively, means to apply the output signals of said first and second clippers to the inputs of said first adding means, means to apply the output signal of said first adding means to the input of said first rectifier, means to apply the output signal of said first clipper to the input of said inverter, means to apply the output signals of said inverter and said second clipper to the inputs of said second adding means, means to apply the output signal of said second adding means to the input of said second rectifier, and means to subtract the output signal of one of said rectifiers from the output signal of the other of said rectifiers.

2. The apparatus of claim 1 further comprising means to integrate the output signal of said means to subtract.

3. The apparatus of claim 1 wherein said means to subtract subtracts the output signal of said second rectifier from the second rectifier from the output signal of said first rectifier.

4. Apparatus for correlating first and second electrical signals comprising means to clip said first and second signals to establish third and fourth signals, respectively, means to sum said third and fourth signals to establish a fifth signal, means to rectify said fifth signal to establish a sixth signal, means to subtract one of said third and fourth signals from the other to establish a seventh signal, means to rectify said seventh signal to establish an eighth signal, and means to subtract one of said sixth and eighth signals from the other to establish a ninth signal.

5. The apparatus of claim 4 further comprising means to integrate said ninth signal over a predetermined time interval.

References Cited in the file of this patent

UNITED STATES PATENTS

| | | |
|---|---|---|
| 2,428,541 | Bagley | Oct. 7, 1947 |
| 2,567,691 | Bock et al. | Sept. 11, 1951 |
| 2,697,201 | Harder | Dec. 14, 1954 |
| 2,854,191 | Raisbeck | Sept. 30, 1958 |
| 2,897,477 | Lindsey | July 28, 1959 |
| 2,906,459 | Lovell | Sept. 29, 1959 |
| 2,907,400 | Swafford | Oct. 6, 1959 |
| 3,017,107 | Moxley | Jan. 16, 1962 |

---

UNITED STATES PATENT OFFICE

CERTIFICATE OF CORRECTION

Patent No. 3,163,750                        December 29, 1964

Joe P. Lindsey et al.

It is hereby certified that error appears in the above numbered patent requiring correction and that the said Letters Patent should read as corrected below.

Column 6, line 3, strike out "from the second rectifier".

Signed and sealed this 6th day of July 1965.

(SEAL)
Attest:

ERNEST W. SWIDER                          EDWARD J. BRENNER
Attesting Officer                            Commissioner of Patents

UNITED STATES PATENT OFFICE
CERTIFICATE OF CORRECTION

Patent No. 3,163,750                      December 29, 1964

Joe P. Lindsey et al.

It is hereby certified that error appears in the above numbered patent requiring correction and that the said Letters Patent should read as corrected below.

Column 6, line 3, strike out "from the second rectifier".

Signed and sealed this 6th day of July 1965.

(SEAL)
Attest:

ERNEST W. SWIDER                      EDWARD J. BRENNER
Attesting Officer                       Commissioner of Patents